Jan. 20, 1970        P. W. KALIKA        3,490,204

GAS CLEANING SCRUBBER

Filed Dec. 26, 1967

INVENTOR.
PETER W. KALIKA

BY C. L. Kocher

ATTORNEY

:::::::::::::::::::::::::::::::::::::::::::::::::::::::::::

United States Patent Office 3,490,204
Patented Jan. 20, 1970

3,490,204
GAS CLEANING SCRUBBER
Peter W. Kalika, Simsbury, Conn., assignor to Combustion Engineering, Inc., Windsor, Conn., a corporation of Delaware
Filed Dec. 26, 1967, Ser. No. 693,268
Int. Cl. B01d 47/10
U.S. Cl. 55—94                              3 Claims

ABSTRACT OF THE DISCLOSURE

An improved Venturi type gas scrubber using the aerothermopressor principle. Dirty gases at high temperature are accelerated in a Venturi section to a Mach number of about 0.6 (about 1000 f.p.s.). The gases are evaporatively cooled at this high velocity by introducing water spray. The gases are decelerated, and a second water spray is introduced downstream where the gases are flowing at a lower velocity which is comparable to that of a conventional Venturi scruber. Downstream of the second spray the agglomerated particles of water and dust are separated from the gas by a conventional separator and removed from the gas stream. Generally fresh water is supplied to the upstream spray and recirculated water from the separator may be supplied to the downstream spray. When the gas flow rate is substantially less than the maximum design capacity, the Venturi section may be reduced in flow area to maintain the substantial aerothermopressor pressure increase, or used as a conventional Venturi scrubber at the new lower velocity occurring in the Venturi throat. The bypass around the high velocity section includes a steam ejector and is used to avoid stalling the aerothermopressor system in the event of a gas flow overload.

BACKGROUND OF THE INVENTION

This invention relates to scrubbing apparatus for hot dirty gases and in particular to a method and apparatus whereby improved scrubbing may be obtained at a lower pressure drop by utilizing the heat energy in the hot gases.

There are many industrial processes where hot waste gases contain particulate matter which must be removed from the gases before they are discharged to the atmosphere. An example of this is the gas flow from a basic oxygen furnace where the gases leaving the furnace are in the order of 3000° F. Conventionally these gases are cooled, partially by the use of heat exchange surface, but predominantly by the introduction of water spray into a large chamber where the gases are cooled and saturated. These gases may then be introduced into a conventional Venturi scrubber where water is introduced at the throat and where it contacts the dust particles and agglomerates into relatively large particle-containing droplets. These droplets are then removed in a separator located downstream.

It is generally recognized that a higher velocity leads to more effective scrubbing, although when the velocity reaches approximately 650 f.p.s., the pressure drop through the Venturi becomes so substantial that an increase in velocity beyond this is impractical. Unless an adjustable Venturi section is used, the velocity through the Venturi decreases at partial ratings and less effective scrubbing is obtained. Even at the conventional velocities used, the Venturi section introduces substantial pressure drop which, in turn, results in substantial power consumption by the fan which is required to maintain flow through the cleaning apparatus.

The aerothermopressor principle has been described in detail in an article entitled "The Aerothermopressor—A Device for Improving the Performance of a Gas-Turbine Power Plant," by A. H. Shapiro, K. R. Wadleigh, B. D. Gavril and A. A. Fowle which was published on page 617 of the April 1956 Transactions of the ASME (volume 78, No. 3). Basically the aerothermopressor is a duct within which atomized water evaporates into a high-speed stream of high temperature gas thereby inducing a rise in isentropic stagnation pressure of the gas stream. This principle is so far removed from the intuitive senses that it was only recognized on the basis of theroetrical calculations but has since been experimentally confirmed.

SUMMARY OF THE INVENTION

In my invention hot dirty gases are scrubbed at high velocity with less pressure drop than in a conventional scrubber but with a higher collection efficiency than conventional Venturi scrubbers. I use the high velocity which has been recognized as providing high collection efficiency but avoid the high pressure drop which the prior art suffers by employing the aerothermopressor principle. This is accomplished by obtaining pressure energy from the heat energy in the hot gases by introducing water first into a high velocity gas stream, thereby evaporatively cooling the gas and obtaining an increase in the stagnation pressure. After partial expansion of the gas to a velocity similar to that of a conventional scrubber, additional scrubbing water is introduced.

The first introduction of water not only provides a pressure increase by its cooling action but also generally saturates the gases and minimizes evaporation at the second spray location. It also replaces a portion of the dust particles with larger water droplets before the second injection thereby providing larger particles to be scrubbed by the second injection, which is located to operate on gases at conventional velocities. This improves the efficiency and, therefore, decreases the water requirements of this scrubber.

The bypass is supplied around the Venturi section and includes pumping means so as to convey a portion of the gas flow around the Venturi section in order to avoid choking of the apparatus on overload.

When operating this apparatus at low loads, the Venturi section may be adjusted to obtain high velocities at the throat and maintain the aerothermopressor pumping action. A fixed Venturi section may however be used in which case the velocities through the Venturi decrease at low loads at such an extent that only nominal pumping action can be obtained. For this type operation I prefer to use the Venturi section as the sole scrubbing means at low loads thereby obtaining an efficiency comparable to that of conventional scrubbers at full load since the velocity in this section is still at a relatively high value. In this event cooling of gases as required will be effected upstream of the Venturi.

Generally fresh water is introduced at the throat of the Venturi to avoid the possibility of plugging of this section which is required to maintain the proper pumping action. Recirculated water from the downstream collector may be used to supply the scrubbing water required at the second injection point which is less critical from the viewpoint of safety of operation.

DESCRIPTION OF THE PREFERRED EMBODIMENT

Figure 1:
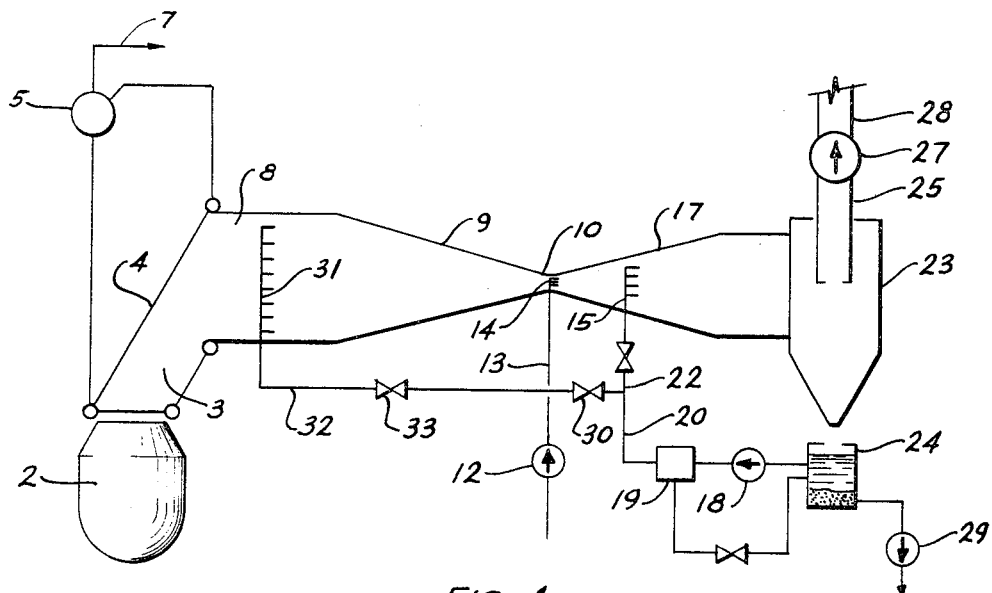
FIG. 1 illustrates my invention as used to clean discharge gases from a basic oxygen furnace.

FIG. 1 illustrates a 200 ton basic oxygen furnace 2 which during normal lancing operation discharges a flow of gas at a temperature of about 3000° F. and at a flow rate of 1,000,000 pounds per hour through hood 3 at 50% excess air. This hood is frequently cooled by steam generating tubes 4 which permit the generation of steam which is separated in steam drum 5 and delivered through steam line 7 to a point of use. The hot gases from the basic oxygen furnace contain solid particles and are passed at a temperature of about 2500° F. through an economically sized duct 8 which results in a velocity of 60–90 f.p.s.

A Venturi section 9 is supplied which reduces the flow area such that the velocity of the gases at the duct 10 of the Venturi section is about Mach 0.6 (1000 f.p.s.). The supply of fresh water is introduced by pump 12 through pipe 13 to spray nozzles 14 located at the throat 10 of the Venturi section. About 80% of this water is evaporated, thereby cooling the gases by the time the gases reach the second injection location where injection nozzles 15 are located. These nozzles 15 are located in divergent portion 17 of the Venturi section at such a location that the velocity is in the order of 650 f.p.s. In order to obtain the proper velocity ratio, the gas flow area at this location must usually be at least 50% greater than the flow area in the throat of the Venturi. Scrubbing water is introduced to these nozzles 15 by means of pump 18 which passes water through a solids-liquid separator 19 and pipes 20 and 22 to the nozzles 15.

The water remaining in the gas stream from the first injection point has by this time encapsulated some of the dust particles thereby providing larger particles or droplets on which injection 15 may operate. This second injection operates as a conventional Venturi scrubber with the gases passing through the separator 23 where the water and dust particles are removed to collection tank 24. The clean gases pass through duct 25 and fan 27 to a discharge duct 28.

Water and dirt are generally separated in tank 24 with the main portion of the dirt or sludge being carried out by pump 29 to waste while the water is used to supply pump 18. Solid particles remaining in this water supply are removed by the previously considered solids-liquid separator 19.

A moderate cooling spray may be used through nozzles 31 in spray duct 8 to minimize material requirements in the Venturi section. There is no gain in using gas temperatures above 2800° F. and therefore proper design would indicate spraying when the gas is above this temperature. The gases entering the scrubber should not be decreased to a temperature less than 1000° F. since the pumping action of the aerothermopressor is insignificant below this temperature. The throat of the Venturi could be designed to result in supersonic velocity, but problems of operation in such a range are difficult. Substantial benefits may be gained so long as the velocity of the throat is above a Mach number of 0.4.

Figure 2:
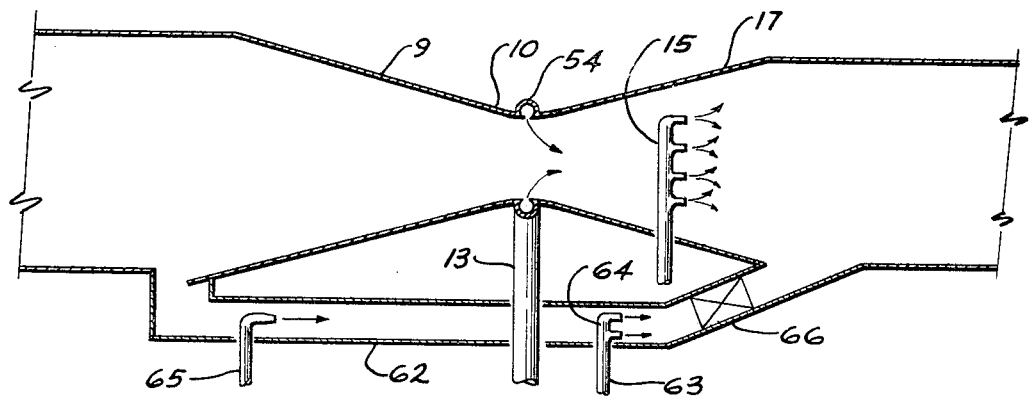
FIG. 2 illustrates a modification of my invention which incorporates a bypass section around the Venturi section.

The high velocity of the gas stream is sufficient to break up the injected water into small droplets so that complicated sprays need not be used but a simple apparatus, such as ring header 54 illustrated in FIG. 2, may be used injecting the water into the gas stream. While it is generally desirable to supply these nozzles with clean water, recirculated water may be supplied to the nozzles by opening valve 30.

In the event that an adjustable Venturi is not used, the velocity through the Venturi will drop with decreasing load. The pressure increase due to the aerothermopressor principle becomes insignificant at lower flow ratings due to the decreased velocity through the Venturi. At the same time the velocity at the downstream spray location drops below that which yields the optimum performance for scrubbing efficiency. Therefore at a flow rating below about 60% of full load rating, the Venturi scrubber is used exclusively for cleaning with the downstream nozzles 15 made inoperative by closing valve 26.

Since nozzles 14 are now the nozzles used for scrubbing, the gas at the throat of the Venturi should be approximately saturated. Therefore valve 33 regulates the water flow through line 32 to nozzles 31 to effect cooling and satuartion of the gases during this phase of the operation.

Since in certain applications there may be inadvertent overdesign flow rates through the scrubbing system and since there may be a tendency for the aerothermopressor to choke depending on the particular design range, FIG. 2 illustrates a duct bypass system to avoid this problem. Where this system is used on a basic oxygen furnace where there is inexorable flow of hot gases, choking would permit hot dangerous gases to spill out into the furnace shop. Therefore bypass duct 62 is located to take its supply from a location upstream of the converging portion of the Venturi 9 and to discharge the gases downstream of the throat 10. An additional water supply passes through pipe 63 to spray nozzles 64 to cool these gases and to provide for some scrubbing capability should the duct discharge downstream of the scrubbing nozzles 15 as illustrated in FIG. 2. Dampers 66 isolate this duct when it is not in operation. Since a pressure increase occurs in passing through the Venturi 9, positive pumping means must be supplied for the gases to pass through duct 62. Steam ejector nozzle 65 is supplied to provide this pumping means. Since the overload will occur at the same time that the basic oxygen furnace is operating at maximum capacity, substantial steam generation will be available in the steam cooled hood; and therefore steam is preferably taken from steam line 7 to supply this nozzle 65.

Fan 27 is required to start flow through the system initially. However once flow is established, sufficient pumping action can be obtained from the aerothermopressor portion to permit operation without fan 27 for certain configurations and design ratings of the aerothermopressor apparatus. Even if the design is not such as to permit the entire draft loss to be overcome by the aerothermopressor pumping action, the duty on fan 27 may still be substantially reduced.

What I claim is:

1. A gas cleaning scrubber for hot dirty gases comprising: a supply duct; a Venturi section downstream of said supply duct having a throat and a diverging pressure recovery portion; a first injecting means for injecting water at the throat of said Venturi section; a second injection means for injecting water at a location directly downstream of the Venturi throat, such that droplet encased dust particles resulting from water injection through said first injecting means remain in suspension at the location of said second injecting means; separating means for removing the droplet encased dust particles from a gas stream at a location downstream from said second injecting means; a bypass duct, said bypass duct being connected to the supply duct at a location upstream of said Venturi section and being also connected at a location downstream of the throat of said Venturi section; ejector pumping means for establishing a gas flow through said bypass in parallel with the flow through said Venturi section, and third injecting means for injecting water at a location in said bypass duct.

2. A method of scrubbing dust from hot gases comprising: conveying hot dust-laden gases through a supply duct at low velocity; accelerating the gas flow at a temperature greater than 1000° F. and less than 3000° F. to a high velocity exceeding a Mach number of 0.5 by restricting the flow area of the duct; injecting water into the gas flow at said high velocity; decelerating the gas flow to a lower velocity less than 700 f.p.s.; injecting water into the gas flow at said lower velocity at a location directly downstream of the high velocity location; further decelerating the gas flow to a lower velocity; and separating the water and dust particles from the gas stream thereby obtaining a flow of clean gases.

3. A method as in claim 2 including also: reducing the quantity of gas flow; injecting water only at said high velocity section when the gas flow is less than 60% of the original quantity.

References Cited

UNITED STATES PATENTS

| | | | |
|---|---|---|---|
| 1,925,407 | 9/1933 | Sieloff | 261—116 |
| 2,539,344 | 1/1951 | Carraway | 98—115 X |
| 2,579,282 | 12/1951 | Vicard | 55—257 |
| 2,604,185 | 7/1952 | Johnstone et al. | |
| 2,729,301 | 1/1956 | Ekstrom | 55—314 X |
| 2,781,251 | 2/1957 | Howell | 23—277 |
| 2,887,390 | 5/1959 | Coulter et al. | 99—199 |
| 3,016,981 | 1/1962 | Fritz | 261—3 X |
| 3,113,168 | 12/1963 | Kinney | 261—22 |
| 3,221,475 | 12/1965 | Wiemer | 55—10 |
| 3,237,381 | 3/1966 | Hvostoff et al. | 55—89 |
| 3,315,443 | 4/1967 | Marino | 55—223 X |
| 3,367,402 | 2/1968 | Cross et al. | 161—1 |
| 3,372,528 | 3/1968 | Hoff | 55—106 |

FOREIGN PATENTS

| | | |
|---|---|---|
| 280,088 | 11/1914 | Germany. |
| 694,404 | 7/1953 | Great Britain. |

OTHER REFERENCES

Willet et al.: "The Venturi Scrubber for Cleaning Oxygen," Iron and Steel Engineer, July 1961, pp. 126–131.

HARRY B. THORNTON, Primary Examiner

DENNIS E. TALBERT, JR., Assistant Examiner

U.S. Cl. X.R.

55—224, 257, 228; 75—28; 98—115; 110—119; 261—3, 25, 63, 116, 118, 22; 266—15